(12) United States Patent
Rinko et al.

(10) Patent No.: US 11,391,880 B2
(45) Date of Patent: *Jul. 19, 2022

(54) OPTICAL MEMBER AND METHOD FOR PRODUCING SAME

(71) Applicant: NITTO DENKO CORPORATION, Osaka (JP)

(72) Inventors: Kari Rinko, Helsinki (FI); Kozo Nakamura, Osaka (JP); Daisuke Hattori, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/400,785

(22) Filed: Aug. 12, 2021

(65) Prior Publication Data

US 2022/0035090 A1  Feb. 3, 2022

Related U.S. Application Data

(63) Continuation of application No. 16/982,251, filed as application No. PCT/JP2019/012029 on Mar. 22, 2019.

(Continued)

(51) Int. Cl.
 *F21V 8/00* (2006.01)
 *G02B 5/02* (2006.01)
 (Continued)

(52) U.S. Cl.
 CPC ......... *G02B 6/0036* (2013.01); *G02B 5/0247* (2013.01); *G02B 6/0023* (2013.01);
 (Continued)

(58) Field of Classification Search
 CPC ................ G02B 6/0036; G02B 6/0031; G02B 6/0076; G02B 6/4243; G02B 6/4259;
 (Continued)

(56) References Cited

U.S. PATENT DOCUMENTS

| | | | |
|---|---|---|---|
| 2004/0022050 A1* | 2/2004 | Yamashita | G02B 6/0046 362/615 |
| 2005/0276556 A1 | 12/2005 | Williams et al. | |
| 2013/0039094 A1* | 2/2013 | Kolb | G02B 1/04 362/618 |
| 2014/0003086 A1 | 1/2014 | Schaffer et al. | |
| 2014/0169029 A1 | 6/2014 | Wardhana et al. | |

(Continued)

FOREIGN PATENT DOCUMENTS

| | | | | |
|---|---|---|---|---|
| CN | 104428694 B | * | 7/2018 | ........... G02B 5/0242 |
| JP | 2002-222604 | | 8/2002 | |

(Continued)

OTHER PUBLICATIONS

International Search Report issued in International Patent Application No. PCT/JP2019/012029, dated Jun. 11, 2019, along with an English translation thereof.

(Continued)

*Primary Examiner* — Mary Ellen Bowman
(74) *Attorney, Agent, or Firm* — Greenblum & Bernstein, P.L.C.

(57) ABSTRACT

The present invention is directed to an optical member including: a first layer that includes a first region having a refractive index $n_1$ and a second region having a refractive index $n_3$; and a second layer disposed on a first main surface of the first layer so as to be in contact with the first region and the second region, the second layer having a refractive index $n_2$. The first layer includes a plurality of said second regions adjoining the first region along a planar direction of the first layer; the plurality of second regions constitute a geometric pattern; and $n_1$ to $n_3$ satisfy the relationship $n1<n3<n2$. When an optical member according to the present invention is integrated with a lightguide in use, excellent light extraction function is exhibited and leakage of light due to light scattering is suppressed, while attaining good mechanical strength at the same time.

12 Claims, 10 Drawing Sheets

Related U.S. Application Data

(60) Provisional application No. 62/646,461, filed on Mar. 22, 2018.

(51) Int. Cl.
  *G09F 13/18* (2006.01)
  *G02B 6/42* (2006.01)

(52) U.S. Cl.
  CPC ......... *G02B 6/0031* (2013.01); *G02B 6/0043* (2013.01); *G02B 6/0055* (2013.01); *G02B 6/0063* (2013.01); *G02B 6/002* (2013.01); *G02B 6/4243* (2013.01); *G02B 6/4259* (2013.01); *G09F 2013/1804* (2013.01)

(58) Field of Classification Search
  CPC ............... G02B 6/0043; G02B 6/0055; G02B 6/0063; G02B 5/0247
  See application file for complete search history.

(56) References Cited

U.S. PATENT DOCUMENTS

| | | | |
|---|---|---|---|
| 2015/0192728 | A1 | 7/2015 | Thompson et al. |
| 2020/0081173 | A1* | 3/2020 | Tak ................. G02F 1/133615 |

FOREIGN PATENT DOCUMENTS

| | | |
|---|---|---|
| JP | 2008-114413 | 5/2008 |
| JP | 2013-524295 | 6/2013 |
| JP | 2015-534100 | 11/2015 |
| WO | 2004/083919 | 9/2004 |

OTHER PUBLICATIONS

Written Opinion issued in International Patent Application No. PCT/JP2019/012029, dated Jun. 11, 2019, along with an English translation thereof.

Extended European Search Report received in Application No. EP 19 77 0456, dated Dec. 15, 2021.

* cited by examiner

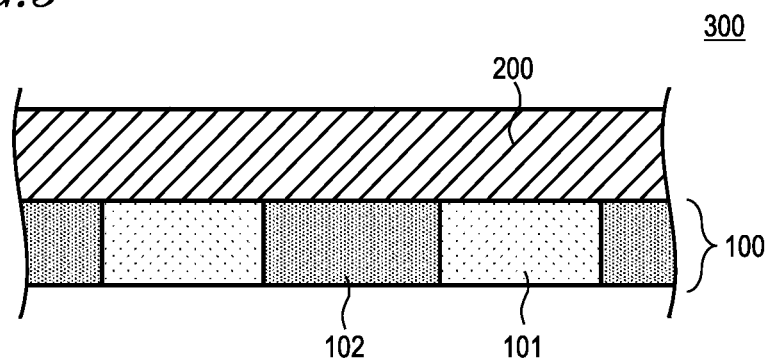
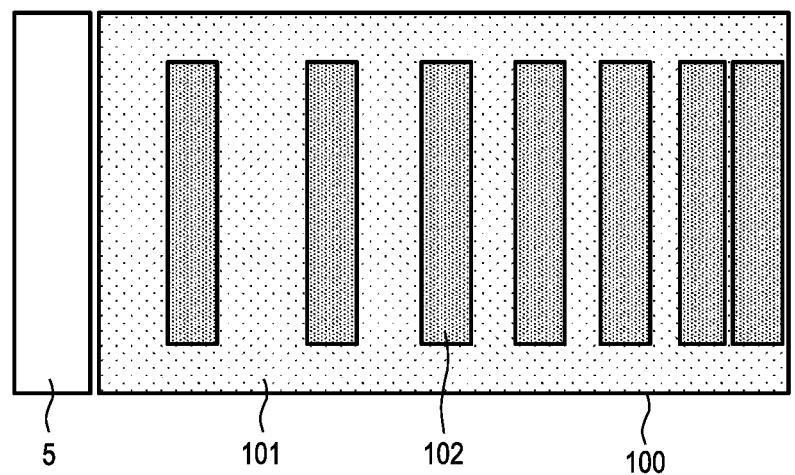

*FIG.13*
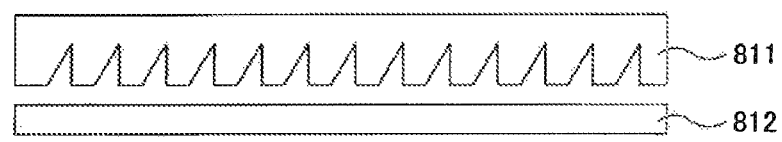
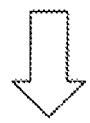
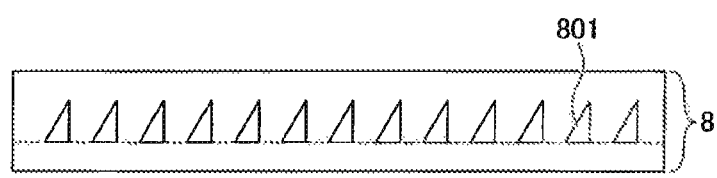

OPTICAL MEMBER AND METHOD FOR PRODUCING SAME

CROSS-REFERENCE TO RELATED APPLICATIONS

This application is a Continuation of U.S. patent application Ser. No. 16/982,251, filed Sep. 18, 2020, which is a National Stage Entry of International Patent Application No. PCT/JP2019/012029, filed Mar. 22, 2019, which claims priority to U.S. Provisional Application No. 62/646,461, filed Mar. 22, 2018. The disclosures of each of the applications listed above are incorporated by references herein in their entireties.

TECHNICAL FIELD

The present invention relates to an optical member for use in illumination devices, image displaying devices, and the like. More particularly, the present invention relates to an optical member which, when integrated with a lightguide, is able to selectively extract light from the lightguide.

BACKGROUND ART

In order to extract light from a lightguide, a lightguide having concave-convex shapes formed on the surface thereof has conventionally been used. In making a lightguide having such concave-convex shapes on the surface, according to the purpose and dimensions, it is necessary to make a mold of the concave-convex shapes each time. In such a lightguide having concave and convex parts, while the presence of air in contact with the concave-convex shapes plays a geometrically important role for light extraction, the lightguide is difficult to be made thin or laminated with other members. Furthermore, as the concave-convex shapes need to be made more precise and complex for realizing multiple functions, the production of lightguides is becoming time-consuming and costly, among other problems.

On the other hand, Patent Document 1 proposes that: a variable-refractive index light extraction layer having a geometric arrangement of two regions of different refractive indices be made; and, when it is integrated with a lightguide, light be selectively extracted from the lightguide.

CITATION LIST

Patent Literature

Patent Document 1: Japanese National Phase PCT Laid-Open Publication No. 2015-534100

SUMMARY OF INVENTION

Technical Problem

The inventors have studied Patent Document 1, and found that the three points as detailed below need to be improved.

Firstly, as shown in FIG. 1, the light extraction layer disclosed in Patent Document 1 includes low-refractive index layers 1 and a high-refractive index layer 2 disposed along the planar direction of the light extraction layer, such that an interface exists at which regions of considerably different refractive indices adjoin, and therefore light scattering due to reflection or refraction at the interface occurs, possibly causing leakage of light.

Secondly, according to the method of producing a light extraction layer disclosed in Patent Document 1, as shown in FIG. 2, the spaces between regions of low refractive index (first region; low-refractive index layers 1) are not sufficiently filled with a second region (high-refractive index layer 2) having a higher refractive index than that of the first region, thus leaving air layers 3, so that not only is there a risk of light scattering, but there is also a risk of insufficient mechanical strength due to the light extraction layer not being sufficiently bonded to the lightguide.

Thirdly, since regions of low refractive index inherently include porous structures, regions of low-refractive index are very brittle and difficult to handle. In addition, there are extreme manufacturing difficulties in creating partial coatings of low refractive index regions on a support substrate.

A problem to be solved by the present invention is to provide an optical member which suffers little light scattering and achieves excellent mechanical strength when being integrated with a lightguide, the optical member enabling selective extraction of light, and a method of easily producing such an optical member.

Solution to Problem

The present invention has been made in view of the above problem, and summary of the present invention is as follows.

An optical member comprising:
- a first layer that includes a first region having a refractive index $n_1$ and a second region having a refractive index $n_3$; and
- a second layer disposed on a first main surface of the first layer so as to be in contact with the first region and the second region, the second layer having a refractive index $n_2$, wherein,
- the first layer includes a plurality of said second regions adjoining the first region along a planar direction of the first layer;
- the plurality of second regions constitute a geometric pattern; and
- $n_1$ to $n_3$ satisfy inequality (1) below.

$$n_1 < n_3 < n_2 \tag{1}$$

Advantageous Effects of Invention

According to the present invention, when an optical member according to the present invention is integrated with a lightguide in use, an effect is provided in that excellent light extraction function is exhibited and leakage of light due to light scattering is suppressed, while good mechanical strength is attained at the same time.

DESCRIPTION OF EMBODIMENTS

The present invention is directed to an optical member, including: a first layer that includes a first region having a refractive index $n_1$ and a second region having a refractive index $n_3$; and a second layer disposed on a first main surface of the first layer so as to be in contact with the first region and the second region, the second layer having a refractive index $n_2$. The first layer includes a plurality of said second regions adjoining the first region along a planar direction of the first layer; the plurality of second regions constitute a geometric pattern; and $n_1$ to $n_3$ satisfy inequality (1) below.

$$n_1 < n_3 < n_2 \tag{1}$$

When an optical member according to the present invention is integrated with a lightguide in use, excellent light extraction function is exhibited and leakage of light due to light scattering is suppressed, while attaining good mechanical strength at the same time.

Hereinafter, the present invention will be described in detail; however, the present invention is not limited to the following embodiments, but may be carried out in some modified forms.

1. Light Distribution Element

First, in order to describe the significance of the optical member according to the present invention, a light distribution element which is obtained by integrating the optical member according to the present invention with a lightguide will be described.

Figure 3:
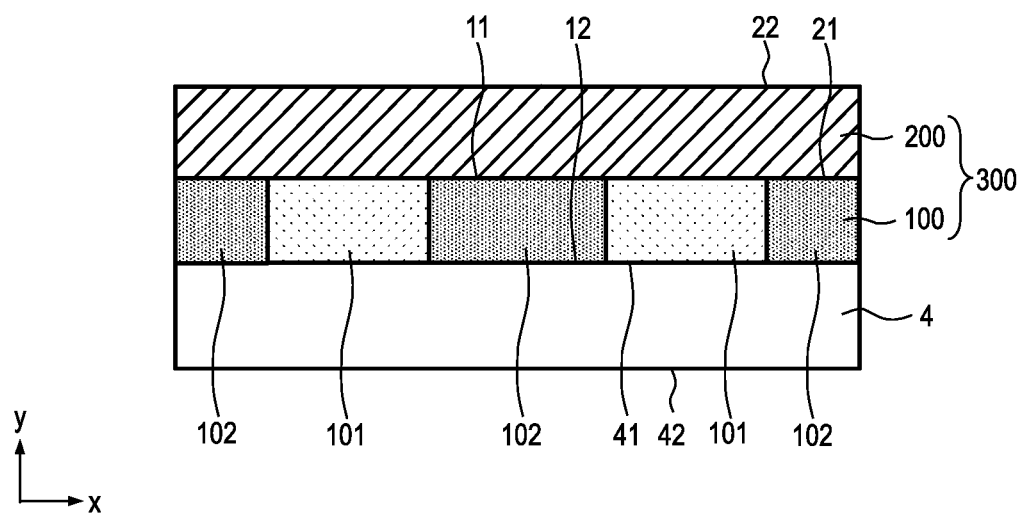

FIG. 3 is a cross-sectional view of an example of employing an optical member 300 according to an embodiment, where the optical member 300 is integrated with a lightguide 4 into a light distribution element, the light distribution element being intended to extract light upwards. In FIG. 3, on a first main surface 11 of a first layer 100, a second layer 200 is provided via a first main surface 21 of the second layer, the second layer 200 being in contact with a first region 101 and second regions 102 of the first layer 100 via the first main surface 21 of the second layer. Moreover, the lightguide 4 is disposed in contact with a second main surface 12 of the first layer 100 via a first main surface 41 of the lightguide 4. As will be described later, the refractive index of the lightguide preferably has a value in the range from −0.1 to +0.1 relative to the refractive index $n_2$ of the second layer. In FIG. 3, where the transverse direction in the cross section defines an x axis and the vertical direction in the cross section defines a y axis, the first layer 100 includes the first region 101 and the second regions 102 along the x axis direction, i.e., along the planar direction of the first layer 100. Herein, on the second main surface 42 of the lightguide 4, an air layer (refractive index 1.00) or a light-reflective element or light-scattering element is disposed (not shown).

Figure 4:
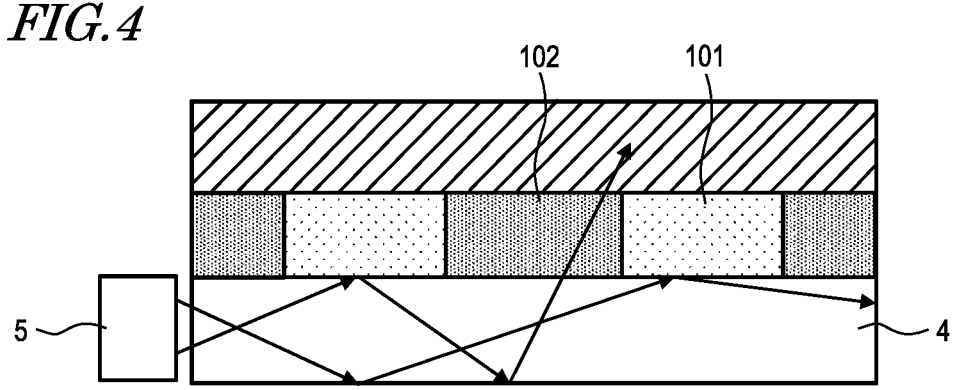

In the light distribution element of FIG. 3, when light is allowed to enter the lightguide 4 from a light source 5, as shown in FIG. 4, light is reflected by the second main surface 42 of the lightguide 4, and guided in the lightguide 4 from left to right in the figure, while reflecting at the first region 101. The light which is guided with repetitive reflections travels through a second region 102 without being reflected, whereby the light is extracted above the light distribution element (out-coupling).

In other words, with the optical member according to the present invention, light can be extracted only from the second regions; therefore, by adjusting a geometric pattern that is created by the first region and the second regions, it becomes possible to extract light from only the desired portions. As a result, desired light extraction characteristics can be realized according to the purpose.

(Lightguide)

The lightguide may typically be composed of a film or plate-like member of resin (preferably a transparent resin). Typical examples of such resins include thermoplastic resins and reactive resins (e.g., ionizing radiation-curable resins). Specific examples of thermoplastic resins include (meth) acrylic resins such as polymethyl methacrylate (PMMA) and polyacrylonitrile, polycarbonate (PC) resins, polyester resins such as PET, cellulose-based resins such as triacetyl cellulose (TAC), cyclic polyolefin-based resins, and styrene-based resins. Specific examples of ionizing radiation-curable resins include epoxy acrylate-based resins and urethane acrylate-based resins. These resins may each be used alone by itself, or any two or more of them may be used in combination.

The thickness of the lightguide may be e.g. 100 μm to 100 mm. The thickness of the lightguide is preferably 50 mm or less, more preferably 30 mm or less, and still more preferably 10 mm or less.

The refractive index of the lightguide usually has a value in the range from −0.1 to +0.1 relative to the refractive index $n_2$, and its lower limit value is preferably 1.43 or more, and more preferably 1.47 or more. On the other hand, the upper limit value of the lightguide is 1.7. Although some examples of the refractive index of the lightguide are given here, in the case where the first region is disposed directly in contact with the lightguide, the refractive index of the lightguide may be designed so that light is reflected by the first region; or, in the case where the first region is disposed on the lightguide via the second layer, the refractive index of the lightguide may be designed by taking the refractive index of the second layer into account so that light is reflected by the first region.

A lightguide to be used in conjunction with an optical member according to the present invention to provide a light distribution element may be a conventional lightguide having concave-convex shapes or the like, e.g., a lightguide which lacks any optical pattern such as a light out-coupling pattern. This novel light distribution element, into which a non-patterned lightguide and an optical member according to the present invention are integrated, provides illumination on a target such as a display surface, for example, typically by boundary interface/surface lamination. This boundary interface lamination allows light to pass and strike a target surface such as a display surface, for example, for illumination or light displaying purposes. Moreover, in order to manipulate the passage and direction of light, the boundary interfaces on both sides may be laminated and controlled through refractive index matching.

A light distribution element into which an optical member according to the present invention and the aforementioned non-patterned lightguide are integrated provides an advantage in terms of efficiency in frontlight solutions. The efficiency relies on the refractive index of the light-guiding medium, and the refractive indices of the layers to be bonded or laminated, claddings, and coatings. In this novel solution, in which the lightguide lacks an optical pattern, minimizes stray light and also improves contrast and efficiency with an enhanced transparency.

Moreover, an optical member according to the present invention, when integrated with a non-patterned lightguide into a light distribution element, can realize an excellent light extraction function even without any concave-convex shapes for light out-coupling (light extraction) on the lightguide.

2. Optical Member

2-A. First Layer

An optical member according to the present invention includes a first layer that includes a first region having a refractive index $n_1$ and second regions having a refractive index $n_3$. With a first layer of such configuration, as described in detail in <1. Light distribution element> above, the light extraction function of the light distribution element is achieved. FIG. 5 shows an example of a cross-section of an optical member 300 according to the present invention, where a geometric pattern s formed in the first layer 100 from the aforementioned first region 101 and second red ions 102. Examples of the geometric pattern include geometric patterns shown in FIG. 6 and FIG. 7. As shown in the plan views of FIG. 6 and FIG. 7, the first region 101 and the second regions 102 are disposed so as to be contiguous with one another, thus constituting the first main surface 11 and the second main surface 12 (see FIG. 3) of the first layer 100. In FIG. 6, in a plane that is defined by the first region 101, a plurality of second regions 102 are formed in stripe shapes. When an optical member according to the present invention is integrated with a lightguide into a light distribution element in use, the geometric pattern created by the plurality of second regions is formed so that the second regions 102 are first sparse and later become denser, based on the position of the light source 5 (e.g., an LED) that is attached to an end of the lightguide.

The thickness of the first layer is not particularly limited so long as the light extraction function is realized; however, usually, its lower limit value may at least be greater than the wavelength of the incident light. Specifically, the lower unit value is 0.3 μm or more. On the other hand, although not particularly limited, its upper limit value is usually 5 μm or less, and more preferably 3 μm or less. So long as the thickness of the first layer is within the aforementioned range, the concave and convex parts of the surface of the light distribution element will not be large enough to affect lamination, so that very easy combination or lamination with other members can be attained.

2-B. First Region

In the present invention, the first region has a refractive index $n_1$. Although the first region may be composed of any suitable material without being particularly limited, it is preferably formed so that $n_1$ is 1.2 or less. The upper limit of $n_1$ is usually 1.2 or less, preferably 1.18 or less, and more preferably 1.15 or less. On the other hand, the lower limit of n1 is not particularly limited, but is preferably 1.05 or more from the standpoint of mechanical strength.

Moreover, in the present invention, the first region may have a pore structure. For example, the pore structure of the first region has one or more kinds of structural units forming a fine pore structure, wherein the structural units are chemically bonded to one another through catalytic action. Thus, in a structure in which the micropore structural units are chemically bonded to one another through catalytic action, since it is not a conventional pore structure whose main component is a binder resin used as the matrix, not only can the refractive index ($n_1$) be made a low refractive index of 1.2 or less, but also the strength of the pore structure itself can be increased. Example shapes of the aforementioned micropore structural unit include particle, fiber, rod, and flat plate shapes. The structural unit may have only one shape, or may have a combination of two or more shapes.

The lower limit value of the porosity of the first region is usually 40% or more, preferably 50% or more, and more preferably 55% or more, On the other hand, its upper limit value is usually 90% or less, and more preferably 85% or less. By keeping the porosity within the above range, the refractive index of the first region can be set in an appropriate range.

An example of a method of measuring the porosity will be described. If the layer of which porosity is to be measured single layer and only contains pores, the rate of air to the substance composing the layer (volume ratio) can be calculated by a usual method (e.g. by measuring weight and volume and calculating the density), whereby the porosity (vol %) can be calculated. Since the refractive index and the porosity are correlated, for example, the porosity can be calculated from the value of the refractive index of a layer. Specifically, for example, the porosity is calculated from the value of the refractive index as measured by an eilipsometer from Lorentz-Lorenz's formula.

The film density of the first region is e.g. 1 $g/cm^3$ more, preferably 10 $g/cm^3$ or more, and more preferably 15 $g/cm^3$ or more. On the other hand, the film density is e.g. 50 $g/cm^3$ or less, preferably 40 $g/cm^3$ or less, more preferably 30 $g/cm^3$ or less, and still more preferably 2.1 $g/cm^3$ or less. The range of film density e.g. 5 $g/cm^3$ to 50 $g/cm^3$, preferably 10 $g/cm^3$ to 40 $g/cm^3$, and more preferably 15 $g/cm^3$ to 30 $g/cm^3$. Alternatively, the range is e.g. 1 $g/cm^3$ to 2.1 $g/cm^3$. The porosity based on the film density of the first region is e.g. 50% or more, preferably 70% or more, and more preferably 85% or more. On the other hand, the porosity based on film density is e.g. 90% or less, and preferably 85% or less.

The film density can be measured by the following method, for example; in another approach, the porosity can be calculated in the following manner based on the film density, for example.

After the first region is formed on the substrate material (acrylic film), regarding the pore regions in this laminate body, an X-ray reflectivity in the total reflection region is measured by using an X-ray diffraction apparatus (RINT-2000: manufactured by RIGAKU Corporation). Then, after fitting the intensity and 2θ, the film density (g/cm$^3$) is calculated from a total reflection critical angle of the laminate body (first region/substrate material), and furthermore a porosity (P %) is calculated from the following equation.

$$\text{porosity } (P\%) = 45.48 \times \text{film density } (\text{g/cm}^3) + 100(\%)$$

It is supposed that the size of pores (voids) in the first region refers to, between the diameter along the major axis and the diameter along the minor axis of each pore (void), their diameter along the major axis. The size of pores (voids) is e.g. 2 nm to 500 nm. The size of pores (voids) is e.g. 2 nm or more, preferably 5 nm or more, more preferably 10 nm or more, and still more preferably 20 nm or more. On the other hand, the size of pores (voids) is e.g. 500 nm or less, preferably 200 nm or less, and more preferably 100 nm or less. The size range of pores (voids) is e.g. 2 nm to 500 nm, preferably 5 nm to 500 nm, more preferably 10 nm to 200 nm, and still more preferably 20 nm to 100 nm. The size of pores (voids) can be adjusted to a desired size, depending on the purpose, application, etc.

The size of the pores (voids) can be quantified by the BET test method. Specifically, 0.1 g of a sample (the formed pore layer) is fed into the capillary of a specific surface area measurement apparatus (ASAP2020: manufactured by Micromeritic), and then the sample is subjected to vacuum drying at room temperature for 24 hours to degas the interior of the pore structure of gases. Then, by allowing nitrogen gas to be adsorbed to the above sample, adsorption isotherms are drawn to obtain a pore distribution. Thus, the pore size can be evaluated.

Examples of the first region having a pore structure include a first region having porous regions and/or air regions. The porous layer typically includes aerogel and/or particles (e.g., hollow microparticles and/or porous particles). The first region may preferably be a nanoporous layer (specifically, a porous layer 90% or more of whose micropores have a diameter in the range from $10^{-1}$ nm to $10^3$ nm).

Any suitable particle can be adopted as the aforementioned particles. The particles typically are composed of a silica-based compound. Examples of the shape of the particles include sphere, plate, needle, string, and grape cluster shapes. Examples of string-shaped particles include for example: a plurality of particles having a sphere, plate, or needle shape connected into a beadroll; short fiber-like particles (e.g., short fiber-like particles described in Japanese Laid-Open Patent Publication No. 2001-188104); and combinations thereof. The string-like particles may be linear-chained or branched. Examples of grape clusters of particles include, for example, a plurality of sphere-, plate-, or needle-shaped particles aggregating into a grape cluster. The shape of the particles can be confirmed, for example, by observing them under a transmission electron microscope. The average particle size of the particle is e.g. 5 nm to 200 nm, and preferably 10 nm to 200 nm. With the above configuration, a first region with a sufficiently low refractive index can be obtained, and the transparency of the first region can be maintained. In the present specification, the average particle size means a value derived, from a specific surface area (m$^2$/g) measured by the nitrogen adsorption method (BET method), by the formula: average particle else=(2720/specific surface) (see Japanese Laid-Open Patent Publication No. 1-317115).

Specific examples of the method of forming the first region according to the present invention will be described in detail at <3. Method of producing optical member>.

2-C. Second Regions

In the present invention, the second regions have a refractive index $n_3$. $n_3$ satisfies the relationship $n_1 < n_3 < n_2$. Since $n_3$ satisfies the above relationship, light scattering due to reflection and refraction at interfaces between the first region and the second regions along the planar direction of the first layer can be prevented, and leakage of light can be suppressed. Although the second regions may be composed of any suitable material without being particularly limited, it is preferably formed so that $n_3$ is not less than 1.25 and not more than 1.4. The lower limit value of $n_3$ is usually 1.25 or more, preferably 1.30 or more, and more preferably 1.35 or more from the standpoint of light extraction function. On the other hand, its upper limit value is 1.4 or less from the standpoint of suppressing leakage of light. The second regions may be designed optically by taking into account the first layer excluding the second regions and the second layer so that, when made into a light distribution element it allows light to be transmitted.

For example, the second regions contain: a substance forming the same pore structure as that of the first region; and a resin or other substance. The refractive index ($n_3$) of the second regions is calculated based on the refractive index and volume fraction of the material composing the first region, the refractive index and volume fraction of air in the pores that are not filled with the resin or the like, and the refractive index and volume fraction of the resin or the like.

In another aspect, the second regions have a skeleton of the same pore structure as that of the first region, and are formed by filling the pores in the pore structure with a resin or other substance. The fill factor of the pores in the second regions is not particularly limited, so long as the fill factor allows the refractive index $n_3$ to be not less than 1.25 and not more than 1.4. Theoretically, when the fill factor is 0%, the refractive index of the second regions is equal to the refractive index of the first region; and when the fill factor 100%, the refractive index of the second regions is to be calculated based on the refractive index and volume fraction of the material composing the pore structure and the refractive index and volume fraction of the resin or other substance used for filling, and has a value smaller than $n_2$.

In another aspect, the second regions are formed to contain: a substance composing the first region; and resin A (described later), which is contained in the second layer. Resin A may be the resin A that is derived from the second layer, or a resin A that is provided separately of the second layer formation. Specifically, the second regions are obtained as resin A fills the pore structure that is formed by the substance composing the first region. Resin A will be described in detail at (2-D. second layer) below.

In another aspect, the second regions are formed to contain: a substance composing the first region; and resin B. Specifically, the second regions are obtained as resin B fills the pore structure that is formed by the substance composing the first region. Examples of resin B contained in the second regions include pressure-sensitive adhesives and energy active ray-curable resins.

Pressure-sensitive adhesive b to be used as resin B is preferably soft enough to be able to permeate the pores in the first region under heating conditions, e.g., the aging step to be described later, for example. Specifically, pressure-sensitive adhesive b has a storage modulus of elasticity of preferably $9.0 \times 10^4$ (Pa) or less, and more preferably $5.0 \times 10^3$ (Pa) to $8.5 \times 10^4$ (Pa). As the aforementioned pressure-sensitive adhesive b, any appropriate pressure-sensitive adhesive may be used so long as it has such characteristics. Examples of the pressure-sensitive adhesive typically include acrylic pressure-sensitive adhesives (acrylic pressure-sensitive adhesive compositions). Acrylic pressure-sensitive adhesive compositions will be described in (2-D. second layer) below. However, the pressure-sensitive adhesive b preferably does not include a heterocyclic-ring containing (meth)acrylate as a comonomer. Details of the acrylic pressure-sensitive adhesive composition composing pressure-sensitive adhesive B are described in, for example, Japanese Laid-Open Patent Publication No. 2016-190996, the disclosure of which is incorporated herein by reference.

As the energy active ray-curable resin to be used as resin B, any appropriate energy active ray-curable resin can be used. Examples of energy active ray-curable resins include photocurable resins, typically UV-curable resins. Specific examples of UV-curable resins include various resins such as polyester-based, acrylic, urethane-based, amide-based, silicone-based, and epoxy-based resins. These include UV-curable monomers, oligomers, polymers and the like. These resins may be used each alone by itself, or in combination (e.g., blending, copolymerization) of a plurality of these resins. Preferably, it is an acrylic resin. The UV-curable acrylic resin includes a monomer component and an oligomer component having preferably two or more, and more preferably three to six, UV-polymerizing functional groups. Specific examples of UV-curable acrylic resins include epoxy acrylate, polyester acrylate, acrylic acrylate, and ether acrylate. Typically, a photopolymerization initiator is mixed in the UV-curable resin. The curing method may be a radical polymerization method or a cationic polymerization method. Since the photocurable resin before curing contains a large amount of monomer components, it offers high ease of application, resulting in the formation of high-precision patterns. Note that the energy active ray-curable resin to be used as resin B may be an energy active ray-curable resin that is used as an adhesive, and the energy active ray-curable resin composition for forming resin B may be an adhesive composition.

Figure 7:
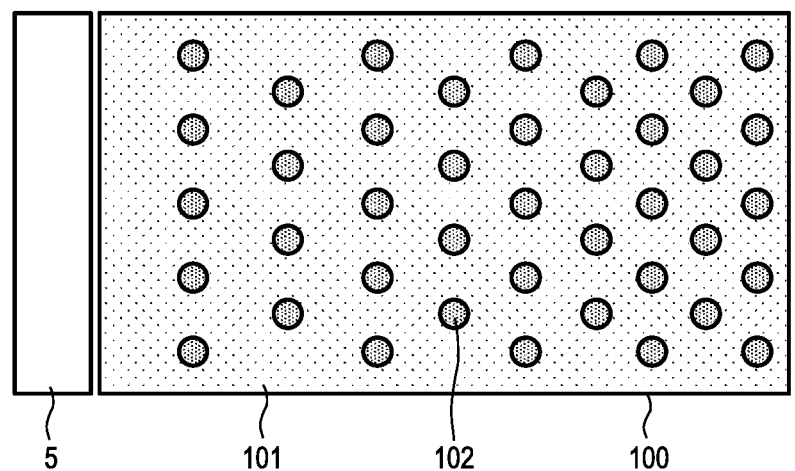

In the present invention, the shape, dimensions of the shape, density within the plane of the first layer, and occupancy in the first layer of the second regions are determined depending on the purpose and application for which the optical member according to the present invention is used. For example, in the case where good visibility, e.g., transparency, is required in the aspect in which the optical member according to the present invention is employed, the major axis of the shape of each second region is preferably 100 μm or less, and more preferably 70 μm or less. More specifically, in the case where the plurality of second regions have a pattern of multiple circles as shown in FIG. 7, the diameter of the each circular second region is preferably 100 μm or less. By adopting such dimensions, when a person observes a device incorporating the optical member according to the present invention at a relatively close distance, as in a mobile display, small-sized signage, etc., the person can be prevented from visually recognizing the second regions. Moreover, the dimensions of one second region, density of the second regions within the plane of the first layer (number of regions/cm$^2$), and the areal occupancy of the second regions may be designed in accordance with the quantity of light that is required in the aspect in which the optical member according to the present invention is employed. The geometric pattern of second regions in the plane of the first layer may be selected arbitrarily from among uniform, local, random, or other patterns, depending on the purpose and application. Alternatively, the geometric pattern may be such that, as shown in FIG. 6 and FIG. 7, the second regions are first sparse and later become denser away from the light source.

In the present invention, the second regions may extend from the first main surface over to the second main surface of the first layer so as to be contiguous with the first region. As in the aforementioned example, the second regions are defined by filled regions, in which the pores in the first region having a pore structure are filled with a resin or other substance. This improves adhesion between the first layer and the second layer provided on the first main surface of the first layer or another member that may be provided on the second main surface of first layer, and realizes excellent mechanical strength. In particular, in the case where the resin or other substance used for filling is a pressure-sensitive adhesive or the like, mechanical strength of the first layer can be improved more significantly. Moreover, when the first layer is configured so that the second regions extend from the first main surface over to the second main surface of the first layer so as to be contiguous with the first region, unintended formation of air layers between the first region and the second regions can be prevented, whereby light scattering can be suppressed.

Specific examples of the method of forming the second regions according to the present invention will be described in detail at <3. Method of producing optical member>.

2-D. Second Layer

The optical member according to the present invention includes a second layer having a refractive index $n_2$. In the present invention, although the second layer may be composed of any suitable material without being particularly limited, it is preferably formed so that $n_2$ is 1.43 or more. The lower limit value of $n_2$ is usually 1.43 or more, and preferably 1.47 or more. On the other hand, the upper limit of $n_2$ is usually 1.7 or less, although not particularly limited. When the aforementioned distribution element has the first layer, the second layer, and the lightguide integrated in this order, the refractive index ($n_2$) of the second layer is desirably equal to the refractive index of the lightguide, or is a close enough refractive index not to exert any optical influences, from optical standpoints.

As for the thickness of the second layer, although it is not particularly limited so long sufficient strength for supporting the first layer is provided, its lower limit value is usually 1 μm or more, preferably 5 μm or more, and more preferably 10 μm or more, and its upper limit value is usually 200 μm or less, and preferably 150 μm or less.

In the present invention, the second layer may be composed of resin A. Examples of a second layer composed of resin A include pressure-sensitive adhesive layer A, a substrate material layer, and the like. Pressure-sensitive adhesive a, as resin A, is preferably such that: under normal temperature and pressure conditions under heating conditions such as the aging step to be described later, pressure-sensitive adhesive a has a sufficient storage modulus of elasticity not to permeate the pores in the first region; and the state of pressure-sensitive adhesive a is able to appropriately change with laser irradiation. From these standpoints, the storage modulus of elasticity of pressure-sensitive adhesive a has an lower limit value which is preferably $1.0 \times 10^5$ (Pa)

or more, and more preferably $1.2 \times 10^5$ (Pa) or more, and an upper limit value which is $1.0 \times 10^6$ (Pa) or less.

As pressure-sensitive adhesive a, any appropriate pressure-sensitive adhesive can be used so long as it has the aforementioned characteristics. Examples of pressure sensitive adhesives typically include acrylic pressure-sensitive adhesives (acrylic pressure-sensitive adhesive compositions). An acrylic pressure-sensitive adhesive composition typically contains a (meth)acrylic polymer as a main component (base polymer). The (meth)acrylic polymer may be contained in the pressure-sensitive adhesive composition at a rate of e.g. 50 wt % or more, preferably 70 wt % or more, and more preferably 90 wt % or more, of the solids content of the pressure-sensitive adhesive composition. As the monomer unit, the (meth)acrylic polymer contains alkyl (meth)acrylate as a main component. Herein, (meth)acrylate refers to acrylate and/or methacrylate. An example of the alkyl group of the alkyl (meth)acrylate may be a linear or branched-chain alkyl group having 1 to 18 carbon atoms. The average number of carbon atoms in the alkyl group is preferably from 3 to 9. Other than alkyl (meth)acrylate, the monomer to compose the (meth)acrylic polymer may include a carboxyl group-containing monomer, a hydroxyl group-containing monomer, an amide group-containing monomer, an aromatic ring-containing (meth)acrylate, a heterocyclic ring-containing (meth)acrylate, and other comonomers. The comonomers are preferably hydroxyl group-containing monomers and/or heterocyclic ring-containing (meth)acrylates, and more preferably N-acryloyl morpholine. The acrylic pressure-sensitive adhesive composition can preferably contain a silane coupling agent and/or a cross-linking agent. An example of the silane coupling agent may be a silane coupling agent containing an epoxy group. Examples of the cross-linking agent include isocyanate-based cross-linking agents and peroxide-based cross-linking agents. Details of such pressure-sensitive adhesive layers or acrylic pressure-sensitive adhesive compositions are described, for example, in Japanese Patent No. 4140736, the disclosure of which is incorporated herein by reference.

The substrate material layer composed of resin A may be an optically transparent resin film, and a typical example thereof may be a film in which a thermoplastic resin or a reactive resin (e.g., an ionizing radiation-curable resin) is used. Specific examples of thermoplastic resins include (meth)acrylic resins such as polymethyl methacrylate (PMMA) and polyacrylonitrile, polycarbonate (PC) resins, polyester resins such as PET, cellulose-based resins such as triacetyl cellulose (TAC), cyclic polyolefin-based resins, and styrene-based resins. Specific examples of ionizing radiation-curable resins include epoxy acrylate-based resins and urethane acrylate-based resins. These resins may each be used alone by itself, or any two or more of them may be used in combination.

3. Method of Producing Optical Member

Hereinafter, a novel method of producing an optical member according to the present invention will be described in detail. So long as an optical member satisfying the relationship $n_1 < n_3 < n_2$ expressed by inequality (1) above is obtained, the method is not limited to the following aspect.

3-A. Laser Irradiation

As a method of producing an optical member according to the present invention, a production method using laser irradiation will described below.

Figure 11:
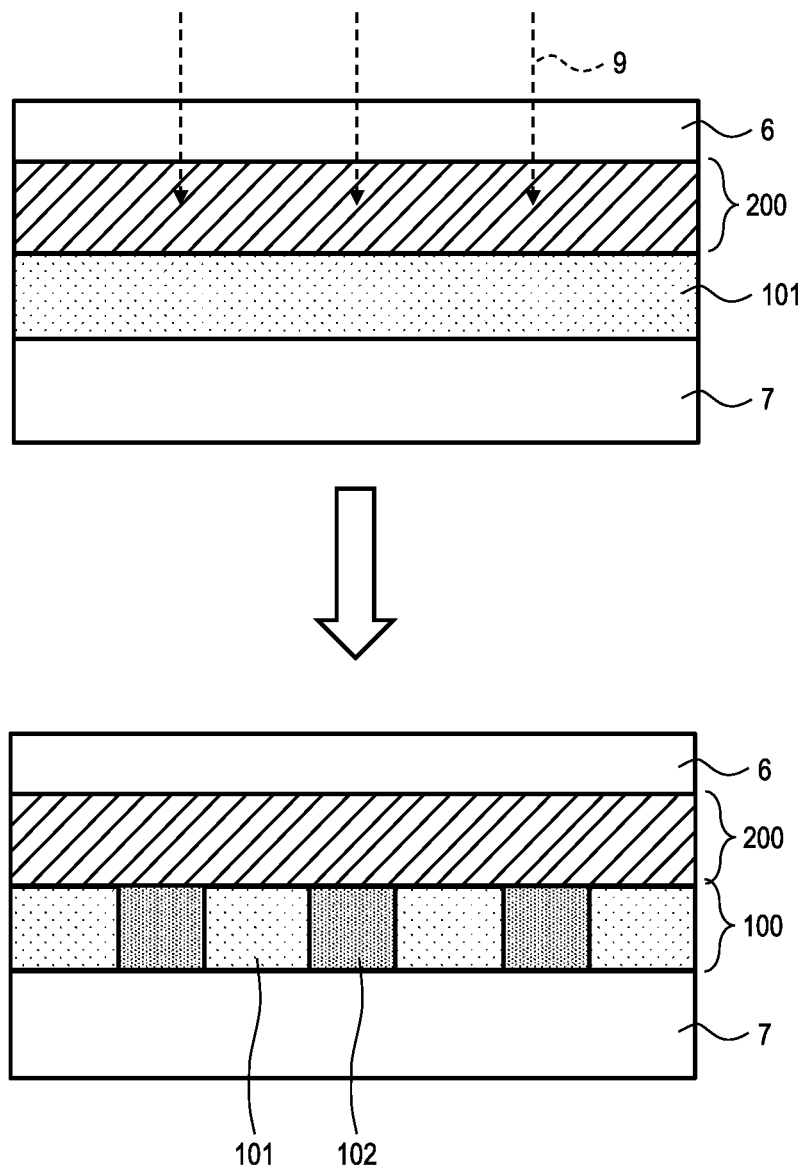

Specifically, as shown in FIG. 11, it is a method in which a precursor of the first layer is formed by using the first region 101; the second layer 200 is provided on a first main surface the precursor of the first layer; a main surface of the second layer 200 not having the first layer is irradiated with laser light 9 in a predetermined pattern, whereby the substance composing the second layer 200 melts and infiltrates the first region 101, thereby forming the second regions 102 (see the lower half in FIG. 11). When the first region has a pore structure and the second layer contains resin A, resin A composing the second layer melts and infiltrates the first region, whereby second regions are formed in which the substance composing the first region and resin A are contained or mixed. In this case, preferably, resin A composing the second layer melts and infiltrates the pores in the first region, and resin A fills the pores in the first region, thereby forming the second regions.

Hereinafter, with respect to an example case where resin A composing the second layer is pressure-sensitive adhesive A, a production method using laser irradiation will be described in more detail.

3-A-a. Formation of Precursor of First Region and First Layer

In the present invention, as described in detail (2-B. first region), the first region may have a pore structure. For example, the pore structure of the first region includes one type or a plurality of types of structural units constituting fine pore structure, where the structural units are chemically bonded to one another through catalytic action. Example shapes of the aforementioned micropore structural unit include particle, fiber, rod, and flat plate shapes. In the case where the micropore structural unit has a particle shape, the first region is formed of a pore structural body of porous material based on chemical bonds between micropore particles. The structural unit may have only one shape, or may have a combination of two or more shapes. Formation of the precursor of the first region and the first layer will now be described with respect to an example case where the first region is a pore structural body of porous material based on chemical bonds between micropore particles. As used herein, the precursor of the first layer means a layer that substantially comprises the first region.

The method of forming the first region serving as the precursor of the first layer typically includes: a precursor formation step of forming, on a resin film or a lightguide, a precursor of a layer comprising the first region (e.g., a precursor of the aforementioned pore structural body of porous material based on chemical bonds between micropore particles); and a cross-linking reaction step of causing a cross-linking reaction inside the precursor after the precursor formation step The method further includes a particle-containing liquid producing step of producing a particle-containing liquid containing micropore particles (hereinafter, a "micropore particle-containing liquid" or simply referred to as a "particle-containing liquid") and a drying step of drying the particle-containing liquid, where the precursor formation step causes the micropore particles within the dried body to become chemically bonded to one another to form the precursor. The particle-containing liquid is not particularly limited, but may be a suspension containing micropore particles, for example. In the present invention, it is preferable that the micropore particles are pulverized matter of a gel-like compound, and it is more preferable that the gel-like compound is a gel-like silicon compound. In this case, the first region is porous silicone.

Through the particle-containing liquid producing step of producing a particle-containing liquid containing micropore particles (hereinafter, a "micropore particle-particle-containing liquid" or simply referred to as a "particle-containing liquid"), a liquid containing the micropore particles (pulverized matter of a gel-like compound) (e.g., suspension) is produced. The micropore particle-containing liquid may be prepared by previously adding catalyst that allows micropore particles to be chemically bonded to one another. Moreover, the catalyst may be added to the particle-containing liquid after the micropore particle-containing liquid has been prepared. The catalyst may be, for example, a catalyst that promotes cross-linking between the micropore particles. As a chemical reaction to chemically bond the micropore particles to one another, when the micropore particles are pulverized matter of a gel-like silicon compound, it is preferable to use the dehydration-condensation reaction of the residual silanol groups in the silica sol molecules. By promoting the reaction between the hydroxyl groups of the silanol groups with a catalyst, a continuous film formation that cures the pore structure in a short time is possible. Examples of catalysts include photoactive catalysts and thermally active catalysts.

With a photoactive catalyst, for example, in a precursor formation step of forming a precursor of a layer comprising the first region, micropore particles can be chemically bonded to one another (e.g. cross-linked) without heating. As a result, in the precursor formation step, for example, shrinking of the entire precursor is unlikely to occur, whereby a higher porosity can be maintained. In addition to or instead of a catalyst, a substance that generates a catalyst (catalyst generating agent) may be used. For example, in addition to or instead of a photoactive catalyst, a substance that generates a catalyst with light (a photocatalyst generating agent) may be used; or, in addition to or instead of a thermally active catalyst, a substance that generates a catalyst with heat (a thermal catalyst generating agent) may be used. Examples of photocatalyst generating agents include photo-base generating agents (i.e., substances than generate basic catalysts with light irradiation), photo-acid generating agents (i.e., substances that generate acidic catalysts with light irradiation), and the like, where photo-base generating agents are preferable.

Next, for example, a resin film or a lightguide is coated with a particle-containing liquid (e.g., a suspension) containing the micropore particles (coating process). Various suitable coating methods can be used for the coating. A coating film containing the micropore particles and the catalyst can be formed by applying the particle-containing liquid containing the micropore particles (e.g., pulverized matter of a gel-like silicon compound) directly onto the resin film or the lightguide.

Next, through a drying step, the coating film that has been produced by applying the micropore particle-containing liquid is dried, and any solvent that was used in the particle-containing liquid, e.g., an organic solvent, is volatized. The drying step may be, for example, natural drying, heat drying, or vacuum drying. Among others, in the case where industrial, continuous production is intended, heat drying is preferably used. The method of heat drying is not particularly limited, and common means of heating can be used, for example. Examples of means of heating include hot air blowers, heating rolls, far-infrared heaters, etc. The temperature of the drying treatment is e.g. 50° C. to 250° C., preferably 60° C. to 150° C., and more preferably 70° C. to 130° C. The duration of the drying treatment is e.g. 0.1 minutes to 30 minutes, preferably 0.2 minutes to 10 minutes, and more preferably 0.3 minutes to 3 minutes. The solvent to be used for the particle-containing liquid is preferably a solvent with low surface tension, for the purpose of suppressing compressive stress caused in the micropore particles due to solvent volatization during drying, or occurrence of cracks in the pore structural body composed of porous silicone that may be caused by compressive stress.

Next, through a cross-linking reaction step, micropore particles in the dried body of the coating film are allowed to be chemically bonded to one another. In the case where pulverized matter of a gel-like silicon compound is used as the micropore particles, in the cross-linking reaction step, for example, micropore particles are chemically bonded to one another through the action of a catalyst (basic substance). As a result, for example, the three-dimensional structure of the pulverized matter in the dried body of the coating film becomes stabilized. In the case of stabilizing the three-dimensional structure through conventional sintering, a high temperature treatment at e.g. 200° C. or higher may be performed, thereby inducing dehydration condensation of silanol groups and formation of siloxane bonds. A cross-linking reaction in which a photocatalyst generating agent is used to generate a catalyst to dehydrate and condense the silanol groups is preferred because the pore structure can be formed and stabilized continuously without causing damage to the resin film and at a relatively low drying temperature around 100° C. and in a short treatment time of less than several minutes. Examples of photocatalyst generating agents include photo-base generating agents (substances that generate a basic catalyst by light irradiation) and photo-acid generating agents (substances that generates an acidic catalyst by light irradiation), where photo-base generating agents are preferred.

A cross-linking reaction using a photocatalyst generating agent is performed by light irradiation. The cumulative quantity of light through light irradiation, although not particularly limited, is e.g. 200 mJ/cm$^2$ to 800 mJ/cm$^2$, preferably 250 mJ/cm$^2$ to 600 mJ/cm$^2$, and more preferably 300 mJ/cm$^2$ to 400 mJ/cm$^2$, converted based on light having wavelength of 360 cm. A cumulative quantity of light of 200 mJ/cm$^2$ or more is preferable, from the standpoint of preventing an insufficient irradiation dose and inadequate decomposition by light absorption of the catalyst and thus insufficient effects. From the standpoint of preventing the formation of thermal wrinkles due to damage to the resin film under the pore structural body, a cumulative quantity of light of 800 mJ/cm$^2$ or less is preferable.

Next, a heating step, which is distinct from the drying step above, is performed. The heating step is performed for the purpose of further promoting cross-linking reaction inside the precursor after the aforementioned cross linking reaction step. Hereinafter, this heating step is referred to as an aging step. In the aging step, the heating temperature is set to a low temperature, and a cross-linking reaction is allowed to occur while suppressing shrinkage of the precursor. As a result, the porosity in the layer comprising the first region, e.g., a pore structural body of porous material based on chemical bonds between micropore particles, is increased, and strength of the pore structural body can be improved. The temperature in the aging step is e.g. 40° C. to 70° C., preferably 45° C. to 65° C., and more preferably 50° C. to 60° C. The duration of the aging step is e.g. 10 hr to 30 hr, preferably 13 hr to 25 hr, and more preferably 15 hr to 20 hr.

For the sake of describing other embodiments below, the precursor after the cross-linking reaction step but before being subjected to the aging step will be referred to as an aging step precursor.

Thus, a precursor of the layer substantially comprising the first region, the first layer, is obtained. Other than by the description in the present specification, the method of producing the precursor of the first layer is also explained by the methods of producing a pore layer or a low-refractive index layer described in Japanese Laid-Open Patent Publication No. 2017-054111, Japanese Laid-Open Patent Publication No. 2018-123233, and Japanese Laid-Open Patent Publication No. 2018-123299.

3-A-b. Formation of Second Layer

In a production method using laser irradiation, the second layer is provided on the precursor of the first layer as obtained above. In the case where the aforementioned precursor of the first layer is formed on a resin film or the like, the second layer is to be provided on a main surface of the aforementioned precursor of the first layer opposite to its surface on which the resin film is provided.

In the case where resin A composing the second layer is pressure-sensitive adhesive a, the second layer composed of pressure-sensitive adhesive a is formed in advance on a separator, and the second layer composed of pressure-sensitive adhesive a is transferred onto the precursor of the first layer, thereby allowing the second layer to be provided on the aforementioned precursor of the first layer.

As for resin A and the like for use in the second layer, see the description in (2-D. second layer).

3-A-c. Formation of Second Regions and First Layer

Hereinafter, a method (hereinafter referred to as the "laser irradiation method") of producing an optical member by using laser irradiation will be described, with respect to a case where the aforementioned precursor of the first layer is composed of a pore structural body of porous material based on chemical bonds between micropore particles and the second layer is composed of pressure-sensitive adhesive a.

The laser irradiation method irradiates the second layer composed of pressure-sensitive adhesive a (referred to as pressure-sensitive adhesive layer A) with laser in a predetermined geometric pattern. As a result, the state of pressure-sensitive adhesive a in the laser-irradiated portion of pressure-sensitive adhesive layer A changes, thereby making it easier for pressure-sensitive adhesive a to permeate the pores in the precursor of the first layer. Pressure-sensitive adhesive a fills the pores in the precursor of the first layer, whereby the second regions are formed in the aforementioned predetermined geometric pattern, as a result of which the first layer is obtained. As will be described later, the second layer may be provided on an aging step precursor, rather than on the aforementioned precursor of the first layer, and subjected to laser irradiation and then an aging step. In his case, the aging step, it is easier for pressure-sensitive adhesive a in the laser-irradiated portion to permeate the pores in the aging step precursor.

Laser irradiation may be performed in any appropriate manner so long as the state of pressure-sensitive adhesive a composing the second layer is changed to make it easier for the pores in the precursor of the first layer to be permeated. The laser light used for laser irradiation includes, usually, light of a wavelength of 100 nm or more as a lower limit, and light of a wavelength of 1900 nm or less as an upper limit. It includes preferably light of a wavelength of 300 nm to 1500 nm, more preferably light of a wavelength of 300 nm to 1300 nm, and still more preferably light of a wavelength of 500 nm to 1200 nm. In one embodiment, the laser light has a Gaussian beam shape, and has a peek wavelength in the aforementioned ranges.

The laser light can be a nanosecond pulsed laser or a short pulsed laser (i.e., a laser that emits light with a pulse width of one nanosecond or less; for example, a picosecond laser or a femtosecond laser). The frequency of the laser light can be 50 kHz to 2000 kHz, for example.

Examples of lasers that emit laser light as described above include: solid-state lasers such as excimer lasers, YAG lasers, YLF lasers, YVO4 lasers, and titanium-sapphire lasers; gas lasers including argon ion lasers, krypton ion lasers; fiber lasers; semiconductor lasers; dye lasers; SHG lasers which are YAG-based; and THG lasers which are YAG-based.

The laser irradiation can de performed, for example, by scanning (drawing) using CAD data. The manner (scan style) of laser irradiation can be set as appropriate, depending on the purpose. The laser light ray be scanned in a straight line, for example, or in an S-shape, or in a spiral pattern, or a combination of these. A high-speed line scanner may also be used. As for the scan head, it may be a galvanometer scanner, a polygon scanner, or a combination of these.

The irradiation conditions of the laser light may be set to any appropriate conditions. For example, when a solid-state laser (YAG laser) is used, the output power is preferably 10 W to 20 W, and the pulse energy is preferably 10 μJ to 70 μJ. The scan speed is preferably 10 mm second to 5000 mm second, and more preferably 100 mm second to 2000 mm second. The scan pitch is preferably 10 μm to 50 μm. The irradiated position of the laser light can be set on the surface of the second layer (i.e., the surface of pressure-sensitive adhesive layer A) or inside the thickness direction of pressure-sensitive adhesive layer A. At the laser irradiation stage, as shown in FIG. 11, a separator 6 is usually temporarily attached to the surface of pressure-sensitive adhesive layer A. In this laser irradiation method, the irradiated position is set on the surface of pressure-sensitive adhesive layer A or inside the thickness direction of pressure-sensitive adhesive layer A (see the upper half in FIG. 11), whereby the state of pressure-sensitive adhesive a of pressure-sensitive adhesive layer A can be changed for the better to allow the pores in the precursor of the first layer to permeate well, thus forming the second regions. The beam shape the irradiated position of the laser light can be set as appropriate, depending on the purpose. The beam shape may be a circle or line shape, for example. Any appropriate means of setting the beam shape to a predetermined shape may be employed. For example, the laser irradiation may be performed through a mask having a predetermined aperture, or the beam shaping may be performed by using a diffractive optical element or the like. For example, if the beam shape is circular, the focal diameter (spot diameter) is preferably 50 μm to 60 μm. Furthermore, the input energy of the pulsed laser is preferably 20000 μJ/mm$^2$ to 100000 μJ/mm$^2$, and more preferably 25000 μJ/mm$^2$ to 75000 μJ/mm$^2$. The input energy E(μJ/mm$^2$) is derived from the following equation.

$$E=(e \times M)/(V \times p)$$

e: pulse energy (J)
M: repetition frequency (Hz)
V: scan speed (mm/sec)
p: scan pitch (mm)

The laser irradiation may preferably be performed in the same step as the aging step for obtaining the precursor of the first layer. By performing the laser irradiation and the aging step concurrently, pressure-sensitive adhesive a is allowed to efficiently permeate the pores in the precursor of the first layer, thus forming the first layer with the second regions formed therein.

(3-B. Ink Jet Technique I)

As a method of producing an optical member according to the present invention, a production method urine ink jet technique will be described below.

Specifically, a method of producing an optical member by ink jet technique converts a resin or other substance into ink, and by an ink jet, fills the pores in the aforementioned precursor of the first layer with the ink in a predetermined geometric pattern, thereby forming the second regions. Alternatively, the pores in the aforementioned aging step precursor are filled with the ink in a predetermined geometric pattern, and the aforementioned aging step is performed to form the second regions. The filling with the ink may be done directly to the pores. Alternatively, it may be done through: a step of leaving a resin or other substance that is provided in a predetermined geometric pattern on the aforementioned precursor of the first layer or aging precursor under normal temperature and pressure, etc., conditions, to cause natural infiltration and filling; or a heating step a such as an aging step to induce softening, thus causing infiltration and filling. Herein, the aforementioned precursor of the first layer and aging step precursor are as described in (3-A-a. formation of precursor of first region and first layer).

In an ink jet technique, the resin being contained in the second regions may be identical to resin A composing the second layer, or may be resin B that is different from resin A. Resin A and resin B have been described in (2-C. second regions) and (2-D. second layer). Resin A has difficulty in infiltrating the pores in the aforementioned precursor of the first layer or the like under normal temperature and pressure and heating conditions (e.g., aging step); on the other hand, resin B or a resin B composition easily infiltrates the pores in the aforementioned precursor of the first layer or the like under normal temperature and pressure and heating conditions (e.g., aging step).

In any of the ink jet techniques described below, the ink diameter and the ink jetting method may be selected in any appropriate manner depending on the shape of the second regions to be formed and the size of the shape.

Hereinafter, with respect to an example case where resin A composing the second layer is pressure-sensitive adhesive a, and resin B contained in the second regions is pressure-sensitive adhesive b, an example (ink jet technique I) of a production method using ink jet technique will be described in more detail.

Figure 12:
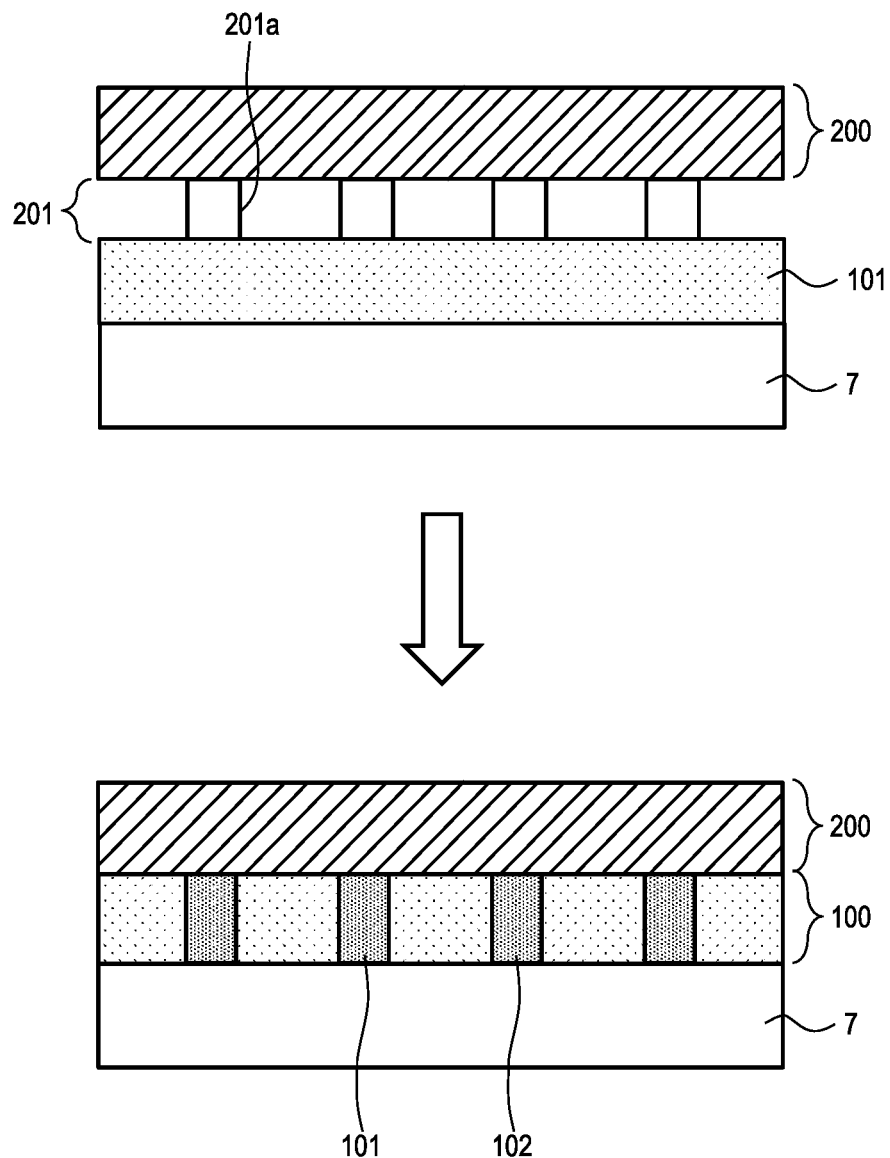

As shown in FIG. 12, on the surface of a pressure-sensitive adhesive layer as the second layer 200, this ink jet technique I forms a predetermined geometric pattern by using, pressure-sensitive adhesive b (201a), thus preparing a pressure-sensitive adhesive laminate body including a resin B pattern layer 201. The surface of the pressure-sensitive adhesive laminate body having the resin B pattern layer 201 thereon is disposed so as to adjoin the first main surface of the aforementioned precursor of the first layer or the aging step precursor, and then pressure-sensitive adhesive b to compose the resin B pattern layer is allowed to infiltrate the pores in the aforementioned precursor of the first layer or the aging step precursor through a heating step such as an aging step. As a result, a first layer is obtained in which second regions 102 are formed in a predetermined geometric pattern, containing pressure-sensitive adhesive b and the substance composing the first region 101 (see the lower half in FIG. 12).

Formation of the geometric pattern of the resin B pattern layer can be achieved by any appropriate means. In one embodiment, the resin B pattern layer may be formed by attaching the cured (i.e., in a usual state) pressure-sensitive adhesive b, in a predetermined pattern, together with pressure-sensitive adhesive layer A. This embodiment is easy and useful in the case where the geometric pattern is stripe- or lattice-shaped, for example. In another embodiment, the resin B pattern layer can be formed in a predetermined geometric pattern by converting the uncured pressure-sensitive composition (pressure-sensitive adhesive b coating liquid) into ink, and printing it via ink-jet and curing it. In this case, a weight-average molecular weight Mw of the base polymer within the pressure-sensitive adhesive b composition is preferably 2000000 or less, and more preferably 5000 to 1600000. When Mw of the base polymer is in such ranges, high-precision pattern formation becomes possible. In still another embodiment, the resin B pattern lever can be formed by applying the uncured pressure-sensitive adhesive b composition (pressure-sensitive adhesive b coating liquid) onto pressure-sensitive adhesive layer A, i.e., the second layer via a mask having a predetermined geometric pattern.

Next, the pressure-sensitive adhesive laminate body of pressure sensitive adhesive layer A/resin B pattern layer having a predetermined geometric pattern is attached together with the precursor of the first layer or the like, in such a manner that the resin B pattern layer having the predetermined geometric pattern adjoins the first main surface of the precursor of the first layer. Since pressure-sensitive adhesive b in the resin B pattern layer is able to permeate the pores in the precursor of the first layer or the like as it is, a first layer having second regions disposed in the predetermined geometric pattern is obtained. When of the first layer, the attaching-together of the pressure-sensitive adhesive laminate body with the aging precursor is preferably followed by an aging step. With such configuration, infiltration of pressure-sensitive adhesive b into the pores in the aging precursor can be promoted by the aging step.

3-c. Ink Jet Technique II

Hereinafter, with respect to an example case where resin A composing the second layer is pressure-sensitive adhesive a and resin B contained in the second regions 102 is an energy active ray-curable resin, another example (ink jet technique II) of a production method using ink jet technique will be described in more detail.

As shown in FIG. 12, on the surface of pressure-sensitive adhesive layer A as the second layer 200, this ink jet technique II forms predetermined geometric pattern by using an energy active ray-curable resin composition 201a, thus preparing a curable resin composition laminate body including a curable resin pattern layer 201. The surface of the curable resin composition laminate body having the curable resin pattern layer 201 thereon is disposed so as to adjoin the first main surface of the aforementioned precursor of the first layer or the aging step precursor, and then, through a heating step such as an aging step, an energy active ray-curable resin composition to compose the curable resin pattern layer is allowed to infiltrate the pores in the aforementioned precursor of the first layer or the aging step precursor, and irradiated with an energy active ray to become an energy active ray-curable resin. As a result, a first layer is obtained in which second regions are formed in a predetermined geometric pattern, containing the energy active ray-curable resin and the substance composing the first region 101 (see the lower half in FIG. 12). In this ink jet technique II, it is preferable that: the curable resin composition laminate body having the curable resin pattern layer is disposed so as to adjoin the aging step precursor; the energy active ray-curable resin composition is allowed to infiltrate the pores in the aforementioned aging step precursor; curing with energy active ray irradiation is performed; and then an aging step is performed.

This ink jet technique II applies the uncured photocurable resin (photocurable resin composition) in a predetermined geometric pattern onto the surface of pressure-sensitive adhesive layer A, for example, disposes the photocurable resin composition so as to adjoin the aforementioned precursor of the first layer or the like, allows the photocurable resin composition to permeate the pores in the aforementioned precursor of the first layer or the like, and photocures it. As a result, the second regions 102 are formed in the predetermined geometric pattern, whereby the first layer is obtained.

Examples of pressure-sensitive adhesive a composing pressure-sensitive adhesive layer A, i.e., the second layer, may be those mentioned in (2-C. second regions). By using any such pressure-sensitive adhesive a, pressure-sensitive adhesive a is prevented from permeating any unwanted portion other than the second regions, whereby the second regions can be precisely obtained in the predetermined geometric pattern. Examples of the energy active ray-curable resin which is resin B may be the energy active ray-curable resins mentioned in (2-D. second layer). As the energy active ray-curable resin, photocurable resins such as UV-curable resins are preferable. Hereinafter, photocurable resins described as examples.

In one aspect of this ink jet technique II, the photocurable resin may be converted into ink, and applied via ink-jet in a predetermined pattern. As described in (2-D. second layer) above, the uncured photocurable resin profusely contains monomer components, and thus is easily converted into ink, and allows itself to be easily applied, thereby enabling high-precision pattern formation. In another aspect, the photocurable resin may be applied to pressure-sensitive adhesive layer through mask having a predetermined geometric pattern.

Next, the photocurable resin composition laminate body including pressure-sensitive adhesive layer A/photocurable resin pattern layer is attached together so that the photocurable resin adjoins the first main surface of the precursor of the first layer or the aging step precursor. The attaching-together of the photocurable resin composition laminate body is preferably performed for the aging step precursor. The curing of the photocurable resin (light irradiation) also preferably performed before the aging step. By performing the curing (light irradiation) before the aging step, unwanted diffusion of the photocurable resin composition (which is substantially a monomer) in the aging step precursor can be suppressed, whereby the second regions can be precisely formed in the predetermined geometric pattern. Specifically, the curing (light irradiation) may be performed after the attaching-together of the photocurable resin composition laminate body with the aging step precursor and before the aging step.

Since the photocurable resin applied on pressure-sensitive adhesive layer A has some ability to maintain shape as it is (i.e., without being cured), performing the curing (light irradiation) after the attaching-together (and before the aging step) presents no substantial problem. In this manner, the photocurable resin is allowed to fill the pores in the aging step precursor through infiltration and light irradiation and the aging step are performed in this order, whereby a first layer including the first region and the second regions formed in the predetermined geometric pattern is obtained.

4. Other Light Distribution Elements

4-A. Modifications of Light Distribution Element

Figure 8:
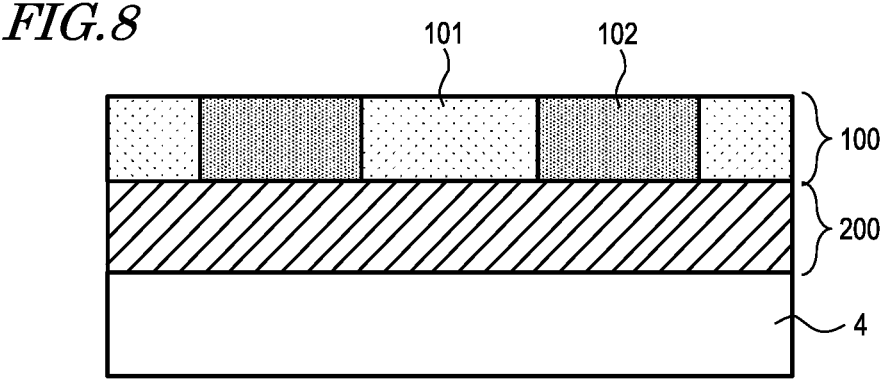

Modifications of the light distribution element described in <1. Light distribution element> above will be explained. In a light distribution element shown in FIG. 8, an optical member according to the present invention is disposed so that the second main surface of the second layer is in contact with a first main surface of a lightguide 4. In the case of the light distribution element shown in FIG. 8, as described in (2-D. second layer), the refractive index ($n_2$) of the second layer is preferably equal to the refractive index of the lightguide or a close enough refractive index not to exert any optical influences, from optical standpoints.

Figure 9:
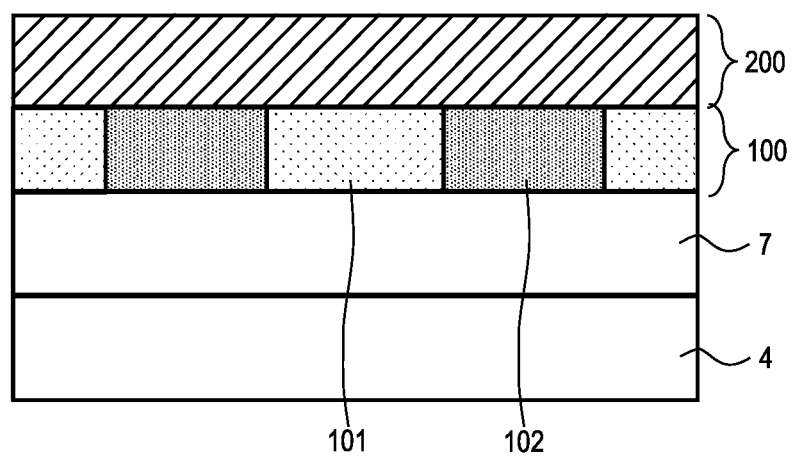

In a light distribution element shown in FIG. 9 a resin film 7 is disposed in contact with the second main surface of the first layer 100 of an optical member according to the present invention and with a first main surface 41 of a lightguide 4. The lightguide 4 and the resin film 7 may be attached together via an adhesive or the like. The resin film 7 may be an optically transparent resin film similar to the substrate material layer described in (2-D. second layer). As the resin film 7, the resin film which is to be coated with a precursor of a pore structural body of porous material based on chemical bonds between micropore particles as described in <3. Method of producing optical member> above may be straightforwardly used. The refractive index of the resin film 7 is preferably equal to the refractive index of the lightguide or a close enough refractive index not to exert any optical influences, from optical standpoints.

Figure 10:
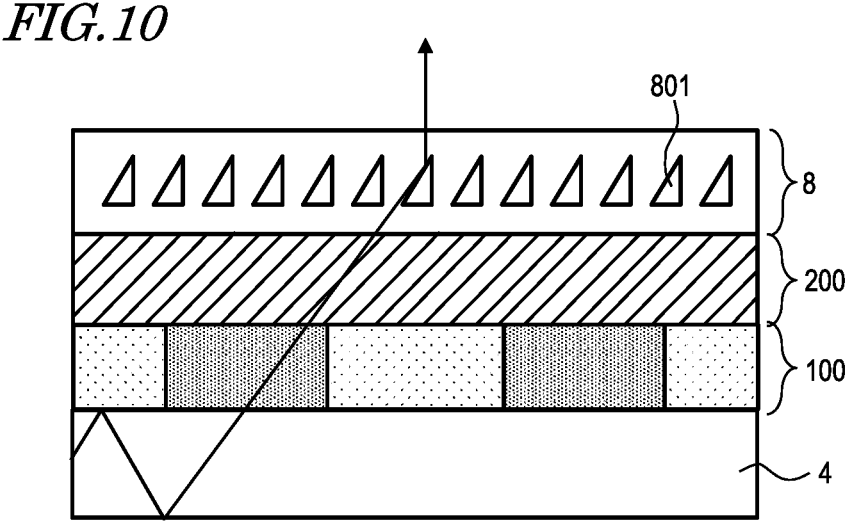

4-B. Light Distribution Element in which a Light Extraction Layer having Cavities (a Member having Air Cavity Pattern Structure to Achieve Light Out-Coupling) is Used FIG. 10 shows a light distribution element that includes a light wide 4, an optical member according to the present invention, and a light extraction layer 8 having cavities. The cavities may also be referred to as air cavities. Specifically, in the light distribution element, the optical member according to the present invention is provided on the non-patterned light extraction side of the lightguide 4 in such a manner that the first layer 100 is in contact therewith, and the light extraction layer 8 having cavities (air cavities 801) is disposed on the second layer 200. In this configuration, light which enters the lightguide 4 from the light source propagates while undergoing total reflection between the bottom surface of the lightguide 4 and the first region 101 of the first layer 100, and light transmitted through the second regions 102 is refracted toward the light extraction side by the light extraction layer 8 having cavities. As a result, light extraction efficiency can be improved, with a uniform luminance distribution.

The light extraction layer 8 having cavities includes an optical cavity pattern that is embedded within the resin layer, the cavity pattern having the function of refracting light. The light extraction layer having cavities may also be referred to as a member having an air cavity pattern structure to achieve light out-coupling. The light extraction layer having cavities can be made of resin, a glass film, or the like. FIG. 13 shows a method of producing the light extraction layer having cavities. FIG. 13 illustrates a lamination method that is adhesive-free. A non-patterned first film 812 and a second film 811 having a desired pattern formed on its surface are attached in an adhesive-free manner (e.g. through microwave surface treatment). The first film 812 and the second film 811 are made of polymethyl methacrylate (PMMA), polycarbonate (PC), or the like. Through the attaching-together, the air cavities 801 are formed.

Another method of producing the light extraction layer having cavities may be a method which adhesively bonds two films by using an adhesion layer. The cohesion layer may have a thickness of about 1 to 3 µm. As the second film 811 and the first film 812 are attached together via the adhesion layer, the air cavities 801 are formed. During the attaching-together, it is ensured chat the pre-cured adhesive does not go into the cavity pattern. The method of attaching together may be any method that does not affect the shape of the air cavities. For example, the laminate surface may be pretreated with a VUV light (vacuum ultraviolet) source or an APP (atmospheric plasma) and then laminated under constant pressure, whereby a chemical bond can be obtained. This method can achieve good mechanical strength.

INDUSTRIAL APPLICABILITY

An optical member according to the present invention may be combined with a lightguide or the like into a light distribution element, being applicable to frontlights, backlights, window/facade illumination, signage, signal illumination, solar applications, decorative illumination, light shields, light masks, roof lighting, or other public or general illumination. For example, an optical member according to the present invention is suitably used as a component element of a frontlight in a reflection type display, which is an example of signage. Using an optical member according to the present invention allows an image or graphic on a reflection type display to be observed without visible blur or other optical disadvantages that may be caused by scattered diffracted light.

Example

Hereinafter, the present invention will be specifically described by way of Examples; however, the present invention is not to be limited to Examples. The method of measuring each property is as follows.

(1) Measurement of Refractive Index

After a first layer was formed on an acrylic film, it was cut into a 50 mm×50 mm size, and via a pressure-sensitive adhesive layer, the first layer was attached onto the surface of a glass pate (thickness: 3 mm). The central portion of the rear surface of the glass plate (diameter: about 20 mm) was thoroughly painted with a black marker, thereby providing a sample in which would not occur at the rear surface of the glass plate. The above sample was set in an ellipsometer (VASE: manufactured by J.A. Woollam Japan, Inc.), and its refractive index was measured at a wavelength of 500 nm and an angle of incidence of 50 to 80 degrees.

(2) Effects of Light Extraction

Via an acrylic pressure-sensitive adhesive (refractive index 1.47, thickness 5 µm), an optical member obtained according to Example 1 below was attached to a resin plate (manufactured by Mitsubishi Chemical Corporation, "Acrylite EX001") having a thickness of 2 mm. Light was allowed to enter at an end of the plate, and the state of light distribution was confirmed visually and with a microscope.

[Manufacturing Example 1] Preparation of Coating Liquid (Micropore Particle-Containing Liquid) for Forming First Region, and Production of Aging Step Precursor Film (1) Gelation of Silicon Compound Mixed solution A was prepared by dissolving 0.95 g of methyltrimethoxysilane (MIMS), i.e., a precursor of a silicon compound, in 2.2 g of dimethyl sulfoxide (DMSO). To this mixed solution A, 0.5 g of 0.01 mol/L acid aqueous solution was added and stirred for 30 minutes at room temperature to hydrolyze the MIMS, thereby producing mixed solution B containing tris(hydroxy)methylsilane.

To 5.5 g of DMSO, 0.28 g of 28 wt % ammonia water and 0.2 g of pure water were added, and then the aforementioned mixed solution B was further added and stirred for 15 minutes at room temperature to gelate the tris(hydroxy) methylsilane, thereby providing mixed solution C containing the gel-like silicon compound.

(2) Aging Treatment

Mixed solution as prepared above, containing the gel-like silicon compound, was incubated at 40° C. for 20 hours as it was, thus carrying out an aging treatment.

(3) Pulverization Treatment

Next, the gel-like silicon compound, which had been subjected to aging treatment as above, was crushed using a spatula into granules of several mm to several cm in size. Then, 40 g of isopropyl alcohol (IPA) was added to mixed solution C. The mixture was gently stirred and left at room temperature for 6 hours, for decantation of the solvent and catalyst in the gel. The same decantation treatment was carried out three times to achieve solvent replacement, thereby providing mixed solution D. Then, the gel-like silicon compound in the mixed solution D was pulverized (high media-less pulverization. As for the pulverization treatment (high pressure media-lass pulverization), 1.85 g of the gel-like compound and 1.15 g of IPA in mixed solution D were weighed into a 5 cc screw bottle, and thereafter these was pulverized under the conditions of 50 W, 20 kHz for 2 minutes by using a homogenizer (S.M.T. Co. Ltd., product name. "UH-50").

Through the pulverization treatment, the gel-like silicon compound in the aforementioned mixed solution was pulverized, which resulted in mixed solution D'being a sol liquid of the pulverized matter. The volume average particle size, which indicates the particle size variation of the pulverized matter contained in mixed solution D', was confirmed to be 0.50 to 0.70 by a dynamic light-scattering nanotrack particle size analyzer (type UPA-EX150 manufactured by Nikkiso Co., Ltd.). Furthermore, to 0.75 g of this sol liquid (mixed solution C'), 0.062 g of a 1.5 wt % MEK (methyl ethyl ketone) solution of a photo-base generating agent (Wako Pure Chemical Industries, Ltd.: product name WPBG266) and 0.036 g of a 5% MEK solution of bis (trimethoxysilyl)ethane were added at these respective ratios, thus providing a coating liquid for first region formation (micropore particle-containing liquid).

A coating film was formed by applying (coating) the above coating liquid onto the surface of an acrylic resin film (thickness: 40 μm) which was prepared according to Manufacturing Example 1 in Japanese Laid-Open Patent Publication No. 2012-234163. The coating was treated at a temperature of 100° C. for 1 minute and then dried, and the dried coating film was further irradiated with UV for an amount of light irradiation (energy) of 300 mJ/cm$^2$ using light having a wavelength of 360 nm, thereby providing a laminate body (an acrylic film with a pore structural layer), having the first region serving as the precursor of the first layer (a pore structural body of porous material based on chemical bonds between micropore particles) formed on the aforementioned acrylic resin film. The pore structural layer had a refractive index of 1.15.

Example 1

Figure 14:
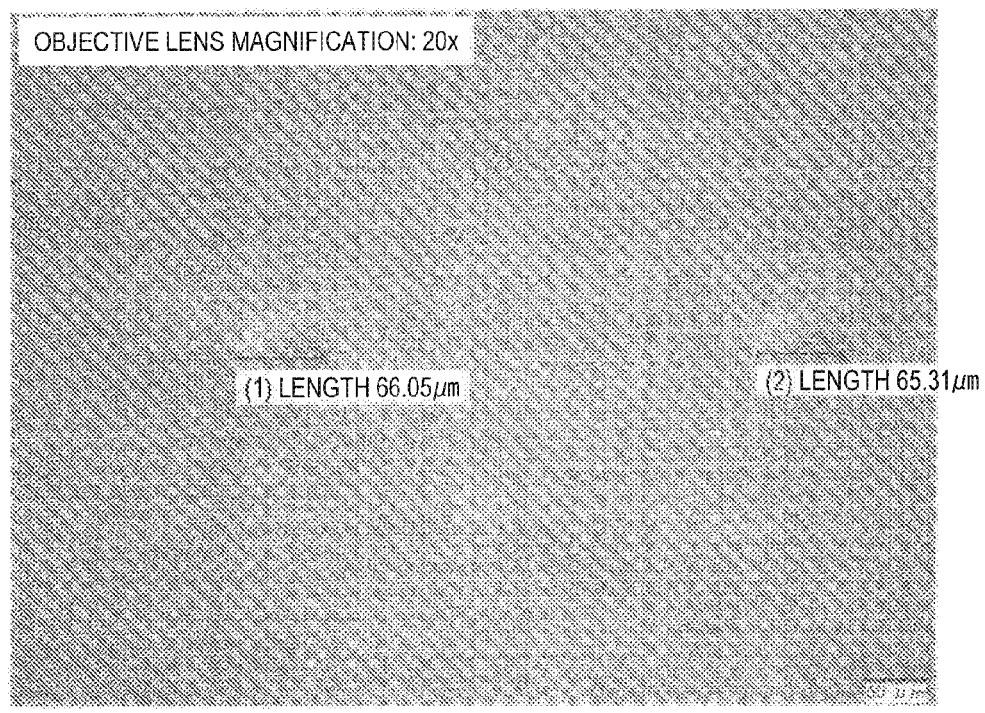
FIG. 14 A micrograph showing that a portion of a geometric pattern of a photocurable resin monomer has been formed on a pressure-sensitive adhesive layer via ink-jet FIG. 15 A calculation model corresponding to Example 1, for use in calculation FIG. 16 A calculation model corresponding to Comparative Example 1, for use in calculation FIG. 17 A graph snowing calculation results of a quantity of light leaking from rear surface in each calculation model

An acrylic pressure-sensitive adhesive (thickness 10 μm, refractive index 1.47) was formed on mold-release treated PET (polyethylene terephthalate). A mixed solution of an epoxy-based monomer adjusted to a concentration of 25% was dropped as ink on a 30 mm×50 mm region of the acrylic pressure-sensitive adhesive, at a 10 mm pitch and in a geometric pattern similar to that in FIG. 7, using "PIJIL-HV inkjet apparatus from Cluster Technology Co., Ltd.". To facilitate observation under a microscope, a small amount of visible light-absorbing dye was added to the mixed solution, thus resulting in a separate mixed solution being produced as the mixed solution for observation. The size of the mixed solution for observation after dropping was observed under a microscope, which indicated that the diameter of one of the regions constituting the geometric pattern formed on they pressure-sensitive adhesive layer was 66 μm, as shown in FIG. 14. After the aforementioned mixed solution was dropped, the pressure-sensitive adhesive having undergone the aforementioned ink treatment was attached together with the pore structural layer having a refractive index 1.15 prepared as above. Thereafter, the pressure-sensitive adhesive layer-pore structural layer laminate body was irradiated with UV light from the pore structural body side, for an irradiation dose of 600 mJ. Then, it was stored in a drying machine at 60° C. for 20 hours, whereby an optical member having a first layer including the second regions was obtained.

Now, in order to confirm the refractive index of the second regions after 24 hours at 60° C. as above, a sample of a layer consisting only of the second regions was obtained separately, in a similar matter to the above but without forming geometric pattern and with dropping the aforementioned mixed solution over the entire surface of the pore structural layer in a range of 50 mm×50 mm. This sample was measured to show a refractive index of 1.35.

The film of the first layer above was attached together with an acrylic plate with a thickness of 2 mm and observed under a microscope while allowing light to enter at an end, whereby it was confirmed that light was being transmitted only through the inked regions (the second regions). The size of the circular second regions was 68 μm in diameter. From the above, it was found that $n_1$ and $n_2$ were respectively 1.15 and 1.47 in the resultant optical, member, and $n_3$ was inferred to be 1.35, given the fact that light was being transmitted.

Comparative Example 1

Figure 1:
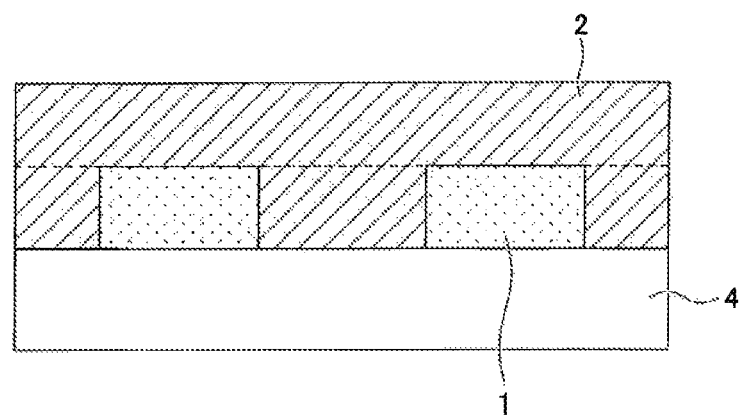
FIG. 1 A cross-sectional view of a conventional light extraction layer
Figure 2:
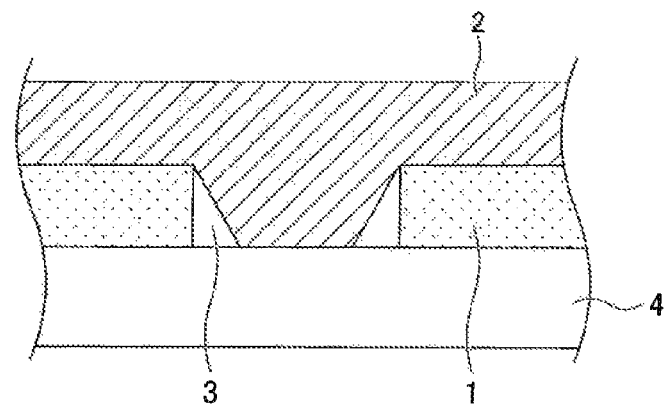
FIG. 2 A cross-sectional view of a light extraction layer obtained by following a conventional method of preparing a light extraction layer FIG. 3 A cross-sectional view of a light distribution element obtained by using an optical member according to the present invention FIG. 4 A diagram showing light guiding by a light distribution element FIG. 5 A cross-sectional view of an optical member according to the present invention FIG. 6 A plan view of a first layer having stripe shapes of a plurality of second regions FIG. 7 A plan view of a first layer having a plurality of circular second regions FIG. 8 A cross-sectional view showing another form of a light distribution element FIG. 9 A cross-sectional view showing another form of a light distribution element FIG. 10 A cross-sectional view showing another form of a light distribution element FIG. 11 A conceptual diagram of forming second regions through laser irradiation FIG. 12 A conceptual diagram of forming second regions via ink-jet FIG. 13 A conceptual diagram of preparing a light extraction layer having cavities (a member having an air cavity structure to achieve light outcoupling)

In Manufacturing Example 1, when coating the acrylic resin film with the coating liquid (micropore particle-containing liquid), a mask pattern may be disposed on the acrylic resin film before applying the coating liquid, and otherwise through a similar manner, a pore structural layer in which a pore structural body in accordance with the mask pattern is partially formed can be formed. By attaching this patterned pore structural layer together with an acrylic pressure-sensitive adhesive (thickness of 10 μm, refractive index 1.47), an optical member having a light extraction layer similar to that of the prior-art document shown in FIG. 1 or FIG. 2 is obtained.

Confirming Leakage of Light With Calculation Software

Figure 15:
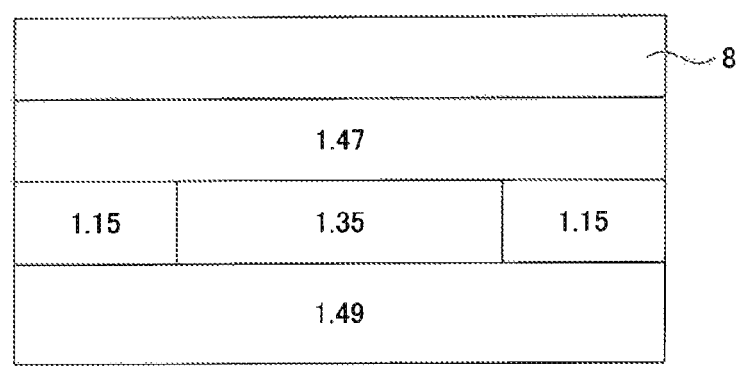
Figure 16:
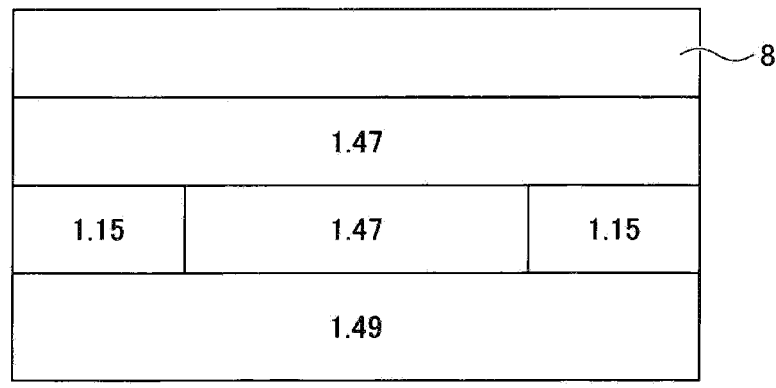

By using Lighttools, optical effects of the present invention were confirmed by using optical members obtained according to Example 1 and Comparative Example 1 as models. The calculation models were established such that, in a lightguide having an area of 90 mm×60 mm, a thickness of 0.4 mm, and a refractive index 1.49, light would enter from the shorter-side end. On the lightguide, a first layer having a thickness of 600 nm was added, in which a first region having a refractive index 1.15 and dots of second regions having a size of 60 μm and a refractive index of 1.35 were present. Next, on the first layer, a second layer having a refractive index of 1.47 and a thickness of 10 μm and a light extraction film having cavities as described in Japanese National Phase PCT Laid-Open Publication No. 2013-324288 were layered in this order, thus providing a model corresponding to a light distribution element in which Example 1 of the present invention as shown in FIG. 15 was used. Photodetecting portions were placed on the front and the rear of the aforementioned model, and quantities of light and distribution were calculated. Except that the second regions had a refractive index of 1.47 as shown in FIG. 16, similarly a model was established corresponding to a light distribution element in which the aforementioned Comparative Example was used, and subjected to calculation. The results are shown in Table 1.

TABLE 1

|  | refractive index of second regions ($n_3$) | refraction gradient between first region and second regions | rear illuminance |
| --- | --- | --- | --- |
| Example 1 | 1.35 | YES | 1491 |
| Comparative Example 1 | 1.47 | NO | 2683 |

Figure 17:
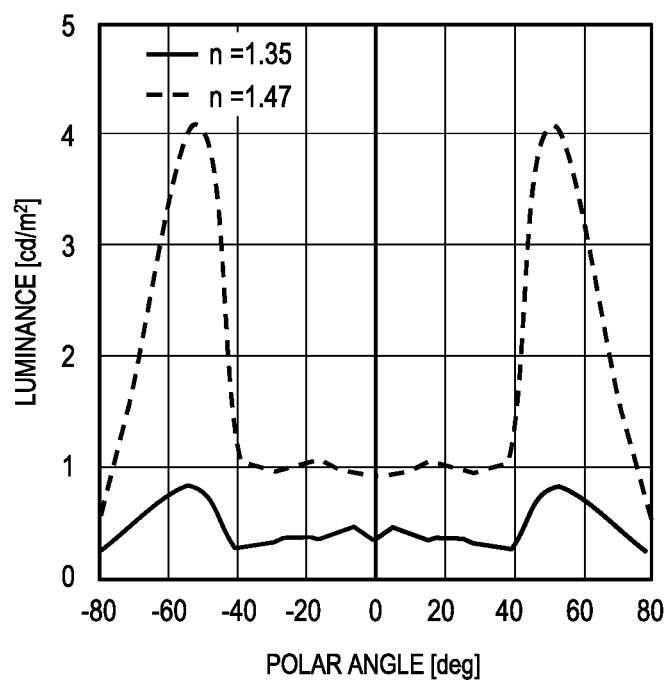

FIG. 17 is a graph showing the quantity of leakage of light the calculation models of Example 1 and Comparative Example 1 when tilted from the center of the rear surface in the left and right polar angle directions. The line (n=1.35) represents the calculation model of Example 1 and the dashed line (n=1.47) represents the calculation model of Comparative Example 1. As can be seen from the graph, near polar angles of ±50 degrees, the calculation model of Example 1, corresponding to the present invention, is able to significantly suppress the quantity of light leaking compared to the calculation model of Comparative Example 1.

From the above results, it can be seen that the refractive index having gradient partly suppresses scattering, whereby leakage of light on the rear surface side is suppressed.

Moreover, in Comparative Example 1, when once partially forming a pore structure, it is very difficult form a stable first layer, thus creating a step when the second layer, e.g., a pressure-sensitive adhesive, is attached to ether, thus making it extremely difficult to obtain an optically uniform and desired appearance.

REFERENCE SIGNS LIST 1 low-refractive index layer (nanopore layer)
2 high-refractive index layer (pressure-sensitive adhesive layer)
3 air layer
4 lightguide
41 first main surface of lightguide
42 second main surface of lightguide
5 light source
100 first layer
11 first main surface of first layer
12 second main surface of first layer
101 first region
102 second region
200 second layer
201 resin B pattern layer
201a pressure-sensitive adhesive b (energy active ray-curable resin composition)
21 first main surface of second layer
22 second main surface of second layer
300 optical member according to the present invention
6 separator
7 resin film
8 light extraction layer having cavities
801 air cavity
811 second film
812 first film
9 laser light

What is claimed is:

1. An optical member comprising:
    a first layer that includes a first region having a refractive index $n_1$ and a second region having a refractive index $n_3$, wherein the first region has a pore structure that does not comprise a resin; and
    a second layer disposed on a first main surface of the first layer so as to be in contact with the first region and the second region, the second layer having a refractive index $n_2$, wherein,
    the first layer includes a plurality of said second regions adjoining the first region along a planar direction of the first layer;
    the plurality of second regions constitute a geometric pattern; and
    $n_1$ to $n_3$ satisfy inequality (1) below:

$$n_1 < n_3 < n_2 \tag{1}.$$

2. The optical member of claim 1, wherein,
    the second layer comprises resin A; and
    the second regions comprise a substance composing the pore structure and resin A.

3. The optical member of claim 1, wherein,
    the second layer comprises resin A; and
    the second regions comprise a substance composing the pore structure and resin B.

4. The optical member of claim 2, wherein the second regions are filled regions which are formed as a result of at least a portion of the pore structure of the first region being filled by resin A.

5. The optical member of claim 3, wherein the second regions are filled regions which are formed as a result of at least a portion of the pore structure of the first region being filled by resin B.

6. The optical member of claim 1, wherein the second regions may extend from the first main surface over to a second main surface of the first layer so as to be contiguous with the first region.

7. The optical member of claim 1, wherein $n_1$ is 1.2 or less and $n_2$ is 1.43 or more.

8. The optical member of claim 2, wherein resin A is pressure-sensitive adhesive a.

9. The optical member of claim 3, wherein resin B is an energy active ray-curable resin.

10. The optical member of claim 1, wherein,
    the first layer excluding the second regions has a refractive index of 1.2 or less;
    the second layer has a refractive index of 1.43 or more; and
    the second regions have a refractive index which is not less than 1.25 and not more than 1.4.

11. A light distribution element comprising the optical member of claim 1 and a lightguide.

12. The light distribution element of claim 11, comprising a light extraction layer having cavities.

* * * * *